US010281606B2

(12) United States Patent
Erdemir et al.

(10) Patent No.: US 10,281,606 B2
(45) Date of Patent: May 7, 2019

(54) CREATING 3C DISTRIBUTED ACOUSTIC SENSING DATA

(71) Applicant: Halliburton Energy Services, Inc., Houston, TX (US)

(72) Inventors: Cemal Erdemir, Houston, TX (US); Mark Elliott Willis, Katy, TX (US); Amit Padhi, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/578,586

(22) PCT Filed: Dec. 22, 2016

(86) PCT No.: PCT/US2016/068265
§ 371 (c)(1),
(2) Date: Nov. 30, 2017

(87) PCT Pub. No.: WO2018/118064
PCT Pub. Date: Jun. 28, 2018

(65) Prior Publication Data
US 2018/0329099 A1   Nov. 15, 2018

(51) Int. Cl.
*G01V 1/48* (2006.01)
*G01V 1/42* (2006.01)
(Continued)

(52) U.S. Cl.
CPC ............... *G01V 1/48* (2013.01); *G01H 9/004* (2013.01); *G01V 1/226* (2013.01); *G01V 1/42* (2013.01); *G01V 2210/161* (2013.01)

(58) Field of Classification Search
CPC ........... G01V 1/48; G01V 1/226; G01H 9/004
See application file for complete search history.

(56) References Cited

U.S. PATENT DOCUMENTS 6,072,567 A   6/2000  Sapack
9,080,949 B2  7/2015  Mestayer et al.
(Continued)

FOREIGN PATENT DOCUMENTS

WO   WO-2016039928   3/2016

OTHER PUBLICATIONS

Karrenbach et al., Field Testing a Three-Component Fiber-Optic Borehole Seismic Sensor Array, 2014 SEG Denver 2014 Annual Meeting, pp. 5019-5023.*

(Continued)

*Primary Examiner* — Toan M Le
(74) *Attorney, Agent, or Firm* — Locke Lord LLP; Daniel Nguyen; Judy R. Naamat

(57) ABSTRACT

A method for processing distributed acoustic sensing (DAS) vertical seismic profiling (VSP) data is provided. The method includes operations to receive DAS data associated with an optical fiber's response to seismic energy applied by three seismic energy sources. The three seismic energy sources each configured to apply seismic energy to the optical fiber in a direction that is orthogonal to a direction of seismic energy applied by the other two seismic energy sources, the optical fiber is at least partially positioned within a wellbore, and the DAS data includes three components directed in an axial direction of the wellbore associated with energy application by the respective three seismic energy sources. The method further includes operations to apply reciprocity to the three components to model an equivalent vertical point force source in the wellbore with receivers configured to receive the three components at a location of the respective three seismic energy sources.

21 Claims, 9 Drawing Sheets

(51) Int. Cl.
  *G01V 1/22* (2006.01)
  *G01H 9/00* (2006.01)

(56) References Cited

U.S. PATENT DOCUMENTS

| | | |
|---|---|---|
| 2005/0090987 A1 | 4/2005 | Amundsen et al. |
| 2012/0063266 A1 | 3/2012 | Hardage |
| 2015/0260567 A1 | 9/2015 | Kuvshinov et al. |
| 2016/0146661 A1 | 5/2016 | Martin et al. |

OTHER PUBLICATIONS

Li et al., Current and Future Applications of Distributed Acoustic Sensing As a New Reservoir Geophysics Tool, 2015, The Open Petroleum Engineering Journal, vol. 8, pp. 272-281 (Year: 2015).*
International Search Report and Written Opinion for PCT Application No. PCT/US2016/068265, dated Sep. 21, 2017.
Mateeva, A. et al., Advances in distributed acoustic sensing (DAS) for VSP. 2012 SEG Annual Meeting, SEG-2012-0739.
Bakku, S.K., Fracture characterization from seismic measurements in a borehole, PhD Thesis, 2014, Massachusetts Institute of Technology.

\* cited by examiner

… (1)

CREATING 3C DISTRIBUTED ACOUSTIC SENSING DATA

TECHNICAL FIELD OF THE INVENTION

The embodiments disclosed herein generally relate to distributed acoustic sensing (DAS) vertical seismic profiling (VSP) measurements of subterranean formations and, more particularly, to methods of generating three component (3-C) seismic data using DAS VSP measurement techniques.

BACKGROUND OF THE INVENTION

Hydrocarbons, such as oil and gas, are commonly obtained from subterranean formations that may be located onshore or offshore. The development of subterranean operations and processes involved in removing hydrocarbons from a subterranean formation are complex. Typically, subterranean operations involve a number of different steps such as, for example, drilling a wellbore through and/or into the subterranean formation at a desired well site, treating the wellbore to optimize production of hydrocarbons, and performing the necessary steps to produce and process the hydrocarbons from the subterranean formation. Some or all of these steps may require and utilize measurements and other sensed data to determine characteristics of the formation, the hydrocarbon, the equipment used in the operations, etc.

One example type of sensed data includes seismic data in the form of a Vertical Seismic Profile (VSP). VSP may refer to the measurement of seismic/acoustic energy in a wellbore originating from a seismic source at a surface of the wellbore (e.g., a vibrator truck, air gun, weight drop, and/or explosives). Traditionally, measurements using VSP (VSP data) are collected using a string of approximately equally spaced geophones and/or hydrophones that are lowered into a wellbore. VSP sampling of a seismic wave field using geophones or hydrophones is typically limited to resolutions on the order of tens of feet.

While the use of geophones or hydrophones enables collection of VSP data in three orthogonal directions, referred to as three-component (3-C) data, deployment of geophone strings for VSP is expensive and time consuming. For example, the geophone string needs to be inserted and retracted before and after each VSP data collection, which, in the case of a producing well, implies that production needs to be halted during collection.

An alternate method of VSP data collection may include the use of DAS techniques. In DAS VSP a fiber optic cable is deployed in the wellbore. Relative to VSP using geophones or hydrophones, DAS VSP provides simplified deployment that does not interfere with operations in the wellbore, acquisition of instantaneous measurement data along a length of the wellbore, and improved resolution. However, DAS VSP data is acquired as only a single component along an axial direction of the fiber optic cable, as opposed to traditional VSP data that can acquire 3-C data in multiple directions.

The ability to improve directionality of data obtained by seismic profiling is of direct relevance to hydrocarbons removal from subterranean formations, particularly for DAS VSP. Accordingly, there is continued interest in the development of improved DAS VSP that can acquire 3-C data.

BRIEF DESCRIPTION OF THE SEVERAL VIEWS OF THE DRAWING

For a more complete understanding of the disclosed embodiments, and for further advantages thereof, reference is now made to the following description taken in conjunction with the accompanying drawings in which.

DETAILED DESCRIPTION OF THE DISCLOSED EMBODIMENTS

Figure 1A:
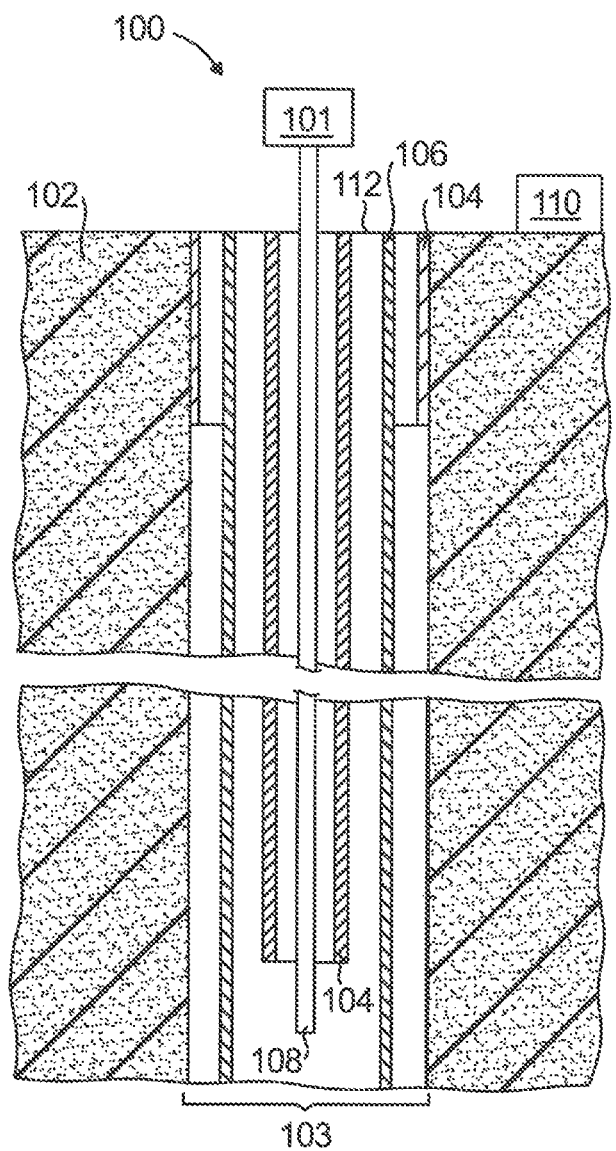
FIG. 1A is a schematic diagram illustrating an example fiber-optic based distributed acoustic sensing (DAS) vertical seismic profiling (VSP) system deployed in a wellbore according to the disclosed embodiments.

The following discussion is presented to enable a person skilled in the art to make and use the invention. Various modifications will be readily apparent to those skilled in the art, and the general principles described herein may be applied to embodiments and applications other than those detailed below without departing from the spirit and scope of the disclosed embodiments as defined herein. The disclosed embodiments are not intended to be limited to the particular embodiments shown, but are to be accorded the widest scope consistent with the principles and features disclosed herein.

The terms "couple" or "coupled" as used herein are intended to mean either an indirect or a direct connection. Thus, if a first device couples to a second device, that connection may be through a direct connection, or through an indirect electrical or mechanical connection via other devices and connections. The term "uphole" as used herein means along a drill string or a hole from a distal end towards the surface, and "downhole" as used herein means along the drill string or the hole from the surface towards the distal end.

It will be understood that the term "oil well drilling equipment" is not intended to limit the use of the equipment and processes described with those terms to drilling an oil well. The terms also encompass drilling natural gas wells or hydrocarbon wells in general. Further, such wells can be used for production, monitoring, or injection in relation to recovery of hydrocarbons or other materials from a subsurface. This could also include geothermal wells intended to provide a source of heat energy instead of hydrocarbons.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or one or more embodiments combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

For purposes of this disclosure, an information processing system may include any device or assembly of devices operable to compute, classify, process, transmit, receive, retrieve, originate, switch, store, display, manifest, detect, record, reproduce, handle, or utilize any form of information, intelligence, or data for business, scientific, control, or other purposes. Examples of well-known computing systems, environments, and/or configurations that may be suitable for use with the information processing system include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices or any other suitable device that may vary in size, shape, performance, functionality, and price.

The information processing system may include a variety of computer system readable media. Such media may be any available media that is accessible by the information processing system, and it includes both volatile and non-volatile media, removable and non-removable media. The information processing system can include computer system readable media in the form of volatile memory, such as random access memory (RAM) and/or cache memory. The information processing system may further include other removable/non-removable, volatile/non-volatile computer system storage media, one or more processing resources such as a central processing unit ("CPU") or hardware or software control logic, and/or ROM. Additional components of the information processing system may include one or more network ports for communication with external devices as well as various input and output ("I/O") devices, such as a keyboard, a mouse, and a video display.

The information processing system may also include one or more buses operable to transmit communications between the various hardware components. A first device may be communicatively coupled to a second device if it is connected to the second device through a wired or wireless communication network which permits the transmission of information.

As stated above, vertical seismic profiling (VSP) may refer to measurement of seismic/acoustic energy in a wellbore originating from a seismic source at a surface of the wellbore (e.g., a vibrator truck, air gun, and/or explosives). Traditionally, these measurements may be recorded by using a string of approximately equally spaced geophones and/or hydrophones. By using such equipment, it is typically possible to sample a seismic wave field at respective locations of deployed geophones or hydrophones in three-orthogonal directions to obtain three-component (3-C) data at resolutions on the order of tens of feet. However, the deployment of geophone strings for VSP is expensive and time consuming. For example, the geophone string needs to be inserted and retracted before and after each VSP data collection, which, in the case of a producing well, implies that production needs to be halted during collection.

An alternate method of collection VSP data may include the use of distributed acoustic sensing (DAS) techniques. In DAS VSP collection methods, the expensive geophone string is replaced by a fiber optic cable having one or more optical fibers deployed in a wellbore. The fiber optic cable may be, for example, cemented into the wellbore wall behind tubulars (e.g. production tubing) or casing, or be temporarily placed in the wellbore (e.g., inside a retrievable wireline or slickline logging cable or via coiled tubing) either with a drill string in place or removed from the wellbore.

As a consequence, DAS VSP data collection techniques may allow for wellbore seismic monitoring during operations, such as stimulation and production, without intervention. In addition, DAS VSP data collection techniques may allow for the collection of data samples of the seismic wave field at resolutions on the order of a meter (as opposed to tens of feet with traditional geophones). Furthermore, DAS VSP data collection may occur over the entire wellbore at one instant, as compared with geophones which are typically deployed in short arrays covering only parts of the wellbore at any one time.

However, since fiber optic cables only sense along an axial direction of the fiber optic cable, DAS VSP data is collected as only single-component (1-C) data.

Embodiments disclosed herein enable acquisition of 3-C data using DAS VSP, such as in connection with oil well drilling equipment. In particular, the present disclosure may include methods for using a source set including two or more point force sources that apply seismic energy oriented in orthogonal directions relative to one another. The source set can include different types of point force sources that apply different types of seismic energy. The source set can include a vertically oriented point force source (also referred to as a P wave source) and one or more horizontally oriented point three sources (also referred to as shear wave sources or S wave sources).

Seismic energy applied by each of the point force sources includes both P and S waves, with different amounts of each wave type (P wave and S wave types) being applied (see, for example, FIG. 5 in U.S. Pat. No. 8,243,548). These different amounts are a function of a measurement angle defined by the direction in which the seismic energy is applied by the point force source relative to the position of the detector or receiver. In a direction parallel (when the measurement angle is 0 degrees) to the direction of application by the point force, more P waves are applied. At measurement angles greater than about 30 degrees from the direction in which the seismic energy is applied by the point force source, S waves dominate the seismic waves that are applied.

Analysis methods are applied that use reciprocity to model an equivalent vertical point force source in the wellbore with a 3C surface receiver receiving, for example, three components of motion by utilizing the optical fiber's vertical response to the seismic energy applied by, for example, three point force sources on the surface. Additionally, corrections are applied to data associated with response of the optical fiber to different types of seismic forces that are applied.

To facilitate a better understanding of the present disclosure, the following examples of certain embodiments are given. In no way should the following examples be read to limit, or define, the scope of the disclosure. Embodiments of the present disclosure and its advantages are best understood by referring to FIGS. 1A-7, where like reference numbers are used to indicate like and corresponding parts.

Embodiments of the present disclosure may be applicable to horizontal, vertical, deviated, multilateral, u-tube connection, intersection, bypass (drill around a mid-depth stuck object and back into the wellbore below), or otherwise nonlinear wellbores in any type of subterranean formation. Certain embodiments may be applicable to, for example, wired drill pipe, coiled tubing (wired and unwired), logging data acquired with wireline, and slickline. Certain embodiments may be applicable to subsea and/or deep sea wellbores. Embodiments described below with respect to one implementation are not intended to be limiting.

Turning now to the drawings, FIG. 1A shows an illustrative example DAS VSP system 100 according to the disclosed embodiments. DAS VSP system 100 may be deployed in association with a wellbore 103. The DAS VSP system 100 may include, among other things, a DAS data collection system 101 coupled to an optical fiber 108 that is at least partially positioned within the wellbore 103 formed in a subterranean formation 102. One or more tubulars 104 may be positioned within the wellbore 103, e.g., in a telescopic fashion. The disclosure is not limited to a particular configuration of the one or more tubulars 104 within the wellbore 103. As understood by those skilled in the art, the optical fiber 108 can include one or more optical fibers. In various embodiments, optical fiber 108 can be positioned, for example, by being hung in the wellbore 103, latched on to the one or more tubulars 104, or cemented behind a casing 106, such as to couple to the formation 102.

It should be noted, any suitable number of DAS VSP systems 100 (each having a different optical fiber 108 at least partially located downhole) may be placed adjacent to wellbore 103. With optical fiber 108 positioned inside a portion of wellbore 103, the DAS VSP system 100 may receive or otherwise obtain seismic data based on disturbances caused by a seismic source set 110. In one embodiment, the seismic source set 110 includes multiple, e.g., three, seismic sources. The seismic sources may include, for example, but are not limited to, vibrators, air guns, weight drops, accelerated weight drops, marine vibrators, mortar gun explosives (e.g., dynamite), thumper trucks, or any other suitable vibration source for creating seismic waves in formation 102. The source set 110 can include, for example, a vertically oriented P wave source and one or more horizontally oriented S wave sources.

The seismic data may correspond to changes in strain or strain rate (in this disclosure collectively referred to as strain) in the optical fiber 108 that are identified by detecting phase changes in backscattered light signals along a length of the optical fiber 108.

Although not depicted in FIG. 1A, the disclosed DAS VSP system 100 further includes an information processing system 200 (shown in FIG. 2) positioned at a surface 112 of the earth. The information processing system 200 may be communicably coupled to the DAS data collection system 101 through, for instance, a wired or wireless connection. DAS data collection systems 101 associated with a plurality of respective DAS VSP systems 100 can be coupled to the information processing system 200. The information processing system 200 may receive measurement in the form of a seismic dataset from the DAS data collection systems 101 and perform one or more actions that will be described in detail below. Additionally, the information processing system 200 may receive a seismic dataset from a data center or storage server in which the seismic data received or otherwise acquired by the DAS data collection systems 101 were previously stored.

Modifications, additions, or omissions may be made to FIG. 1A without departing from the scope of the present disclosure. For example, the DAS data collection system 101 and optical fiber 108 may be used during wireline or slickline logging operations before some or all the tubulars 104 have been secured within the wellbore 103, and/or before the wellbore 103 is completed. Moreover, components may be added to or removed from the DAS VSP system 100 without departing from the scope of the present disclosure.

Figure 1B:
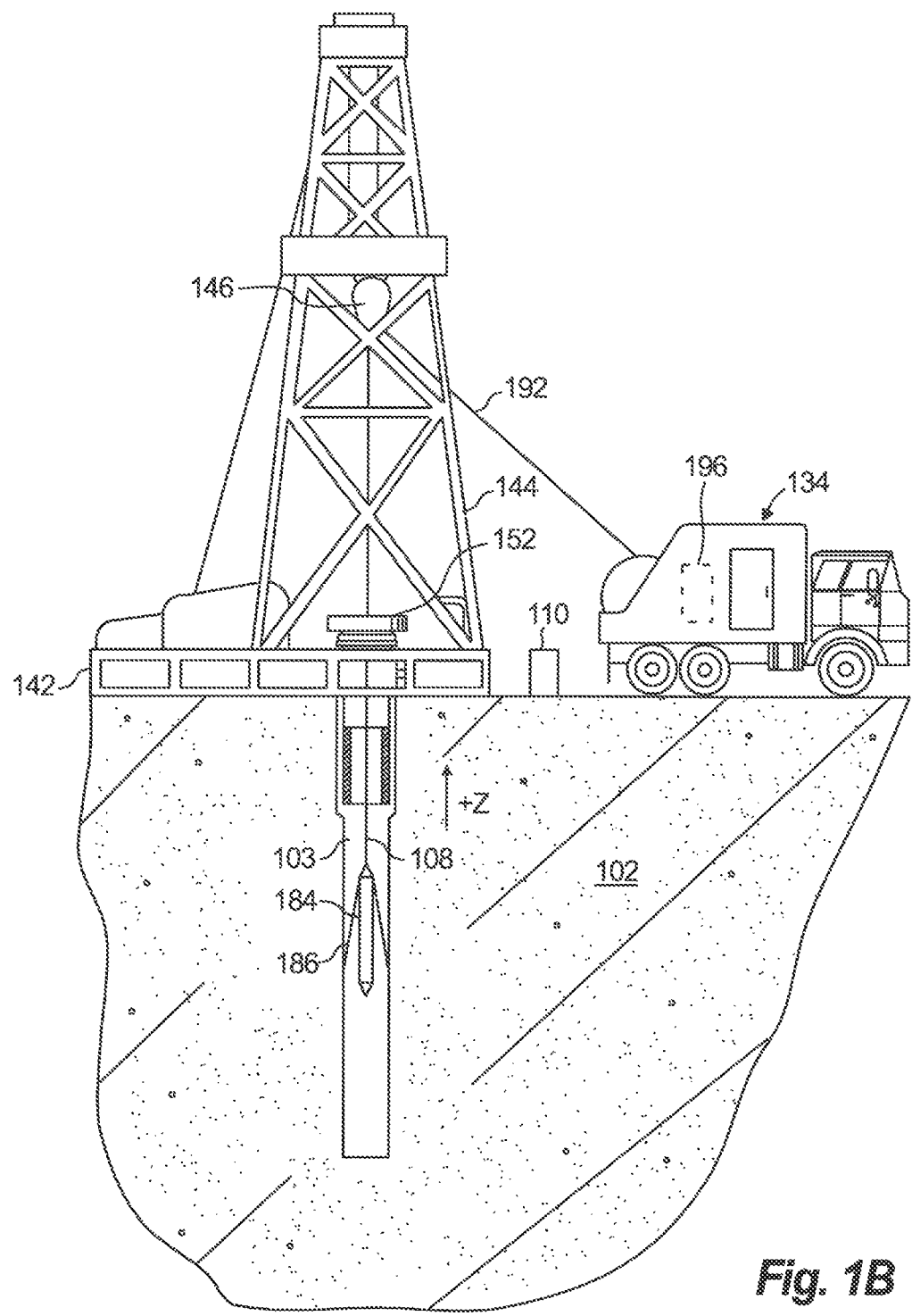
FIG. 1B is a schematic diagram that illustrates an example wireline logging environment.

FIG. 1B shows another suitable context for describing the operation of the disclosed systems and methods in which a wireline configuration is used. Logging operations can be conducted using a wireline logging tool 184, e.g., a sonde sensing instrument, suspended by a cable 192. The cable 192, which includes optical fiber 108, is positioned within the wellbore 103. Cable 192 can further include conductors for transporting power to the tool 184 and/or communications from the tool 184 to the surface of the wellbore 103. Seismic source set 110 is positioned at the surface 112 of the formation 102. A logging portion of the wireline logging tool 184 may have centralizing arms 186 that center the tool 184 within the wellbore 103 as the tool 184 is pulled uphole. An optional logging facility 134 collects measurements from the wireline logging tool 184, and includes computing facilities 196 (e.g., that can include information processing system 200 shown in FIGS. 2 and 3) for processing and storing the measurements gathered by the wireline logging tool 184.

Figure 2:
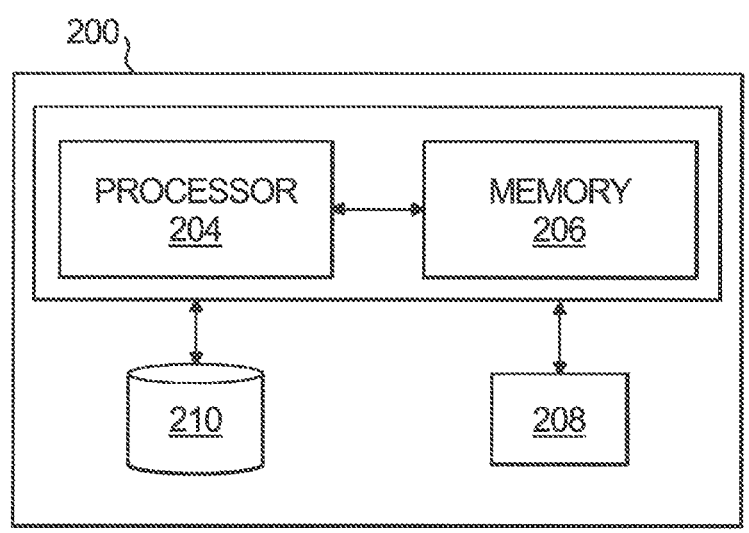
FIG. 2 is a block diagram illustrating an exemplary information processing system, in accordance with embodiments of the present disclosure.

FIG. 2 illustrates a block diagram of an exemplary information processing system 200, in accordance with embodiments of the present disclosure. The information processing system 200 may be configured to receive seismic datasets from a DAS VSP system and perform one or more noise reduction methods and data quality evaluation methods that will be described in detail below. The information processing system 200 can be used with different drilling and logging systems positioned at different locations.

The information processing system 200 includes a processor 204. Processor 204 may include, for example a microprocessor, microcontroller, digital signal processor (DSP), application specific integrated circuit (ASIC), or any other digital or analog circuitry configured to interpret and/or execute program instructions and/or process data. As depicted, the processor 204 is communicatively coupled to memory 206 and configured to interpret and/or execute program instructions or data retrieved and stored in memory 206. Program instructions or data may constitute portions of DAS data processing software module 208 for carrying out methods of DAS data processing, as described herein.

Memory 206 may include any system, device, or apparatus configured to hold and/or house one or more memory modules; for example, memory 206 may include read-only memory, random access memory, solid state memory, or disk-based memory. Each memory module may include any system, device or apparatus configured to retain program instructions and/or data for a period of time (e.g., computer-readable non-transitory media). For example, instructions from the DAS data processing software module 208 may be retrieved and stored in memory 206 for execution by processor 204.

In one or more embodiments of the present disclosure, received seismic datasets acquired by a DAS VSP system may be stored in database 210 for long-term storage. In certain embodiments, the information processing system 200 may further include one or more displays or other input/output peripherals such that information processed by the information processing system 200 (e.g., seismic data from a DAS VSP system) may be conveyed to operators of drilling and logging equipment.

Modifications, additions, or omissions may be made to FIG. 2 without departing from the scope of the present disclosure. For example, FIG. 2 shows a particular configuration of components of information processing system 200. However, any suitable configurations of components may be used. For example, components of information processing system 200 may be implemented either as physical or logical components. Furthermore, in some embodiments, functionality associated with components of information processing system 200 may be implemented in special purpose circuits or components. In other embodiments, functionality associated with components of information processing system 200 may be implemented in configurable general purpose circuits or components. For example, components of information processing system 200 may be implemented by configured computer program instructions.

Figure 3:
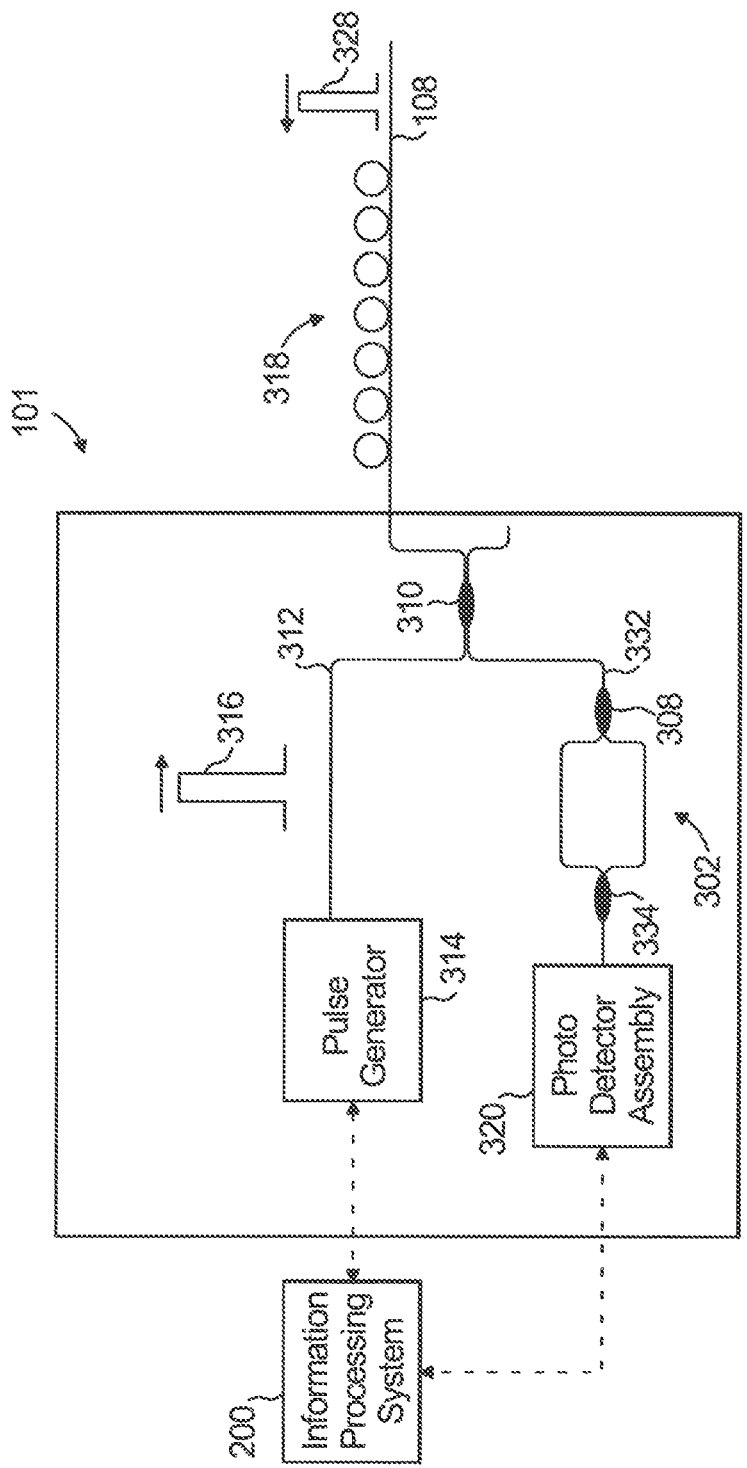
FIG. 3 is a schematic diagram illustrating an example system for processing DAS data in accordance with embodiments of the present disclosure.

FIG. 3 illustrates DAS data collection system 101 in greater detail, with a configuration that can process DAS VSP surveys in real-time in accordance with embodiments of the present disclosure. As mentioned above, the information processing system 200 may be communicatively coupled to the DAS data collection system 101. The DAS VSP collection system 101 may be combined or otherwise incorporated into the DAS VSP system 100 described above with reference to FIG. 1A. The DAS VSP collection system 101 also may be incorporated into other drilling, logging, and completion systems that would be appreciated by one of ordinary skill in the art having the benefit of this disclosure.

For example, the DAS VSP collection system 101 may include a scattering system, such as a single-pulse coherent Rayleigh scattering system with a compensating interferometer, but is not intended to be limited to such. In embodiments, the DAS VSP collection system 101 may be used for phase-based sensing of events in a wellbore using measurements of scattering, e.g., Rayleigh scattering, Raman scattering, or Brillouin scattering, or may interrogate a fiber optic line containing an array of partial reflectors, for example, fiber Bragg gratings.

The DAS VSP collection system 101 may include a pulse generator 314 coupled to a first coupler 310 using an optical fiber segment 312. The pulse generator 314 may be a laser, or a laser connected to at least one amplitude modulator, or a laser connected to at least one switching amplifier, i.e., semiconductor optical amplifier (SOA). The pulse generator 314 may be located at any suitable location when performing subterranean operations. For instance, in some embodiments, the pulse generator 314 may be located at the surface 112 of the formation 102 (see FIG. 1A).

The first coupler 310 may be a traditional fused type fiber optic splitter, a circulator, a PLC fiber optic splitter, or any other type of splitter known to those with ordinary skill in the art having the benefit of this disclosure. The pulse generator 314 may be coupled to optical gain elements (not shown) to amplify pulses generated therefrom. Example optical gain elements include, but are not limited to, Erbium Doped Fiber Amplifiers (EDFAs) or Semiconductor Optical Amplifiers (SOAs).

The DAS VSP collection system 101 may include an interferometer 302, for example, without limitation, a Mach-Zehnder interferometer. The interferometer 302 may be coupled to the first coupler 310 through a second coupler 308 and an optical fiber segment 332. The interferometer 302 further may be coupled to a photodetector assembly 320 of the system 101 through a third coupler 334 opposite the second coupler 308. The second coupler 308 and third coupler 334 may be a traditional fused type fiber optic splitter, a PLC fiber optic splitter, or any other type of optical splitter known to those with ordinary skill in the art having the benefit of this disclosure.

The photodetector assembly 320 may include associated optics and signal processing electronics (not shown). The photodetector assembly 320 may be a semiconductor electronic device that uses photoelectric effect to convert light to electrical signals. The photodetector assembly 320 may be, for example, an avalanche photodiode or a pin photodiode but is not intended to be limited to such.

In operation of the system 101, the pulse generator 314 may generate a first optical pulse 316 which is transmitted through the optical fiber segment 312 to the first coupler 310. The first coupler 310 may direct the first optical pulse 316 through the optical fiber 108, which may be coupled to the first coupler 310. Although a linear deployment of the optical fiber 108 is typical, different geometries may be used. For example, at least a portion of the optical fiber 108 may be arranged in coils 318. As the first optical pulse 316 travels through the optical fiber 108, imperfections in the optical fiber 108 may cause a portion of the light to be backscattered along the optical fiber 108 due to scattering, e.g., Rayleigh scattering.

Scattered light according to Rayleigh scattering is returned from every point along the optical fiber 108 along the length of the optical fiber 108 and is shown as backscattered light 328 in FIG. 3. This backscatter effect may be referred to as Rayleigh backscatter. The optical fiber 108 may be terminated with a low reflection device (not shown). In certain implementations, the low reflection device may be a fiber coiled and tightly bent to violate Snell's law of total internal reflection such that all the remaining energy is sent out of the fiber.

The backscattered light 328 may travel back through the optical fiber 108, until it reaches the second coupler 308. The first coupler 310 may be coupled to the second coupler 308 on one side by the optical fiber segment 332 such that the backscattered light 328 may pass from the first coupler 310 to the second coupler 308 through the optical fiber segment 332. The second coupler 308 may split the backscattered light 328, allowing the split light to pass through different paths of the interferometer that have different configurable lengths and then be re-combined at the third coupler 334 after exiting the interferometer 302. The third coupler 334 outputs an interferometric signal that is sensed by the photodetector assembly 320 which responds by outputting corresponding electrical signals.

The interferometer 302 may facilitate generation of the interferometric signal through relative phase shift variations between light pulses travelling through the different interferometer paths, such as caused by the length differences of the paths. The interferometric signal may include backscattered light from two positions alone the optical fiber 108 such that a phase shift of backscattered light between the two different points along the optical fiber 108 can be identified in the interferometric signal.

While the DAS VSP collection system 101 is operating, the interferometric signal will typically vary over time. The variations in the interferometric signal may identify strains in the optical fiber 108 that are caused, for example, by seismic energy. By using time of flight for the optical pulse 316, the location of the strain along the optical fiber 108 and a time at which it occurred can be determined. If the optical fiber 108 is positioned within a wellbore, the locations of the strains in the optical fiber 108 can be correlated with depths in the formation in order to associate the seismic energy with locations in the formation and wellbore.

The photodetector assembly 320 may receive output from the interferometer 302 and transmit electrical signals to the information processing system 200, which may process the electrical signals to identify strains within the optical fiber 108 and/or convey the data to a display and/or store it in computer-readable media. The photodetector assembly 320 and the information processing system 200 may be communicatively and/or mechanically coupled. Thus, the information processing system 200 may be located uphole, downhole, or at a remote location. The information processing system 200 may also be communicatively or mechanically coupled to the pulse generator 314.

Modifications, additions, or omissions may be made to FIG. 3 without departing from the scope of the present disclosure. For example, FIG. 3 shows a particular configuration of components of system 101. However, any suitable configurations of components may be used. For example, a compensating interferometer may be placed in a launch path (i.e., prior to traveling down optical fiber 108) of interrogating pulse to generate a pair of pulses that travel down optical fiber 108. In such embodiments, an interferometer may not be necessary to interfere with the backscattered light from pulses prior to being sent to photodetector assembly. In one branch of the compensation interferometer in the launch path of the interrogating pulse, an extra length of fiber not present in the other branch is used to delay one of the pulses.

To accommodate phase detection of backscattered light using system 101, one of the two branches may include an optical frequency shifter (for example, an acousto-optic modulator) to shift the optical frequency of one of the pulses, while the other may include a gauge. This may allow using a single photodetector receiving the backscatter light to determine the relative phase of the backscatter light between two locations by examining a heterodyne beat signal received from the mixing of the light from different optical frequencies of the two interrogation pulses.

As another example, system 101 may generate interferometric signals for analysis by the information processing system 200 without the use of a physical interferometer. For instance, system 101 may direct backscattered light to photodetector assembly 320 without first passing it through any interferometer, such as interferometer 302 of FIG. 3.

Alternatively, the backscattered light from the interrogation pulse may be mixed with the light from the laser originally providing the interrogation pulse. Thus, the light from the laser, the interrogation pulse, and the backscattered signal may all be collected by photodetector 320 and then analyzed by information processing system 200. The light from each of these sources may be at the same optical frequency in a homodyne phase demodulation system, or may be different optical frequencies in a heterodyne phase demodulator. This method of mixing the backscattered light with a local oscillator allows measuring the phase of the backscattered light along a fiber relative to a reference light source.

Furthermore, in embodiments, a continuously modulated interrogation signal may be emitted into the fiber instead of a pulse (e.g., pulse 316). For example a phase, frequency, or amplitude modulator following the laser may be used instead of a pulse generator (such as pulse generator 314) to send coded or spread-spectrum interrogation signals down the optical fiber 108 to allow distributed seismic sensing using information processing system 200.

With reference to FIGS. 1A, 2, and 3, in operation, the seismic energy source set 110 is activated at the surface of the wellbore 103 to generate sound waves through the formation 102. Some examples of sources included in the source set 110 may include a vibrator, an explosive (e.g., dynamite), air guns, a thumper truck, or any other suitable vibrational source for VSP data collection.

These sound waves in the formation may cause measurable strain changes of the optical fiber 108. In particular, the DAS VSP collection system 101 may send optical pulses down the optical fiber 108 at a particular rate, portions of which may backscatter toward the optical pulse generator 314 at various positions of the optical fiber 108, as described above. These reflections may be measured at various times over finite time durations (which may coincide with the rate and duration of the optical pulse generation) to measure strain changes in the optical fiber 108 at various depths.

Each measurement captured by the DAS VSP collection system 101 may be referred to as a "sweep." Typically, after some source reset period and/or listen time, the energizing of the source is repeated to start a new recording, such as from a new source position. Thus, a typical raw measurement record includes both sweep and listen time. Characteristics of the sound waves (e.g., amplitude and duration) received at the optical fiber 108, which may be referred to as acoustic activity, may be determined based, at least in part, on the measured strain changes.

One sweep may include seismic data in the form of acoustic activity for all DAS measured depths along the wellbore over the finite time duration. The seismic data within a sweep may be de-multiplexed to generate traces (or channels) of the seismic data at the various data collection depths. The traces may indicate the seismic data at a particular depth in the wellbore over the time duration of the sweep. In various embodiments, each trace may be associated with a different activation of the source set 110 by the DAS data collection system 101. Using the information from one or more sweeps (source repetitions of the DAS data collection system 101), properties of the formation 102 may be determined. For example, the speed of a formation (i.e., the speed of sound in the formation) may be determined. As another example, the seismic data may be used to form underground images.

The DAS data collection method described above may be a more efficient way of collecting the seismic data when compared with using traditional geophones to collect such information. Data collection using geophones may require substantial time and physical effort as compared with the DAS method previously described. For example, geophones may need to be physically raised and/or lowered, and source energizing may be repeated thereafter for every depth sample (channel) of seismic data collected, which may take minutes or hours to perform.

In contrast, using DAS techniques as described, data for all depths may be collected by sending optical pulses about every hundred microseconds for usually less than a minute down a fiber optic cable in a wellbore (without the need to raise or lower the fiber optic cable). Advantageously, an activation of the source set 110 can enable acquisition of DAS data associated with responses of the optical fiber 108 to the activation along the entire length of the optical fiber 108. Scattering from random impurities in the optical fiber 108 occurs along the length of the optical fiber 108 when the optical fiber 108 is deformed by seismic energy induced by the source set 110. Time-of-flight of laser pulses can be processed to obtain channel spacing of approximately 1

(one) meter, providing a density of samples that is higher than conventional VSP using geophones and improved resolution.

Figure 4A:
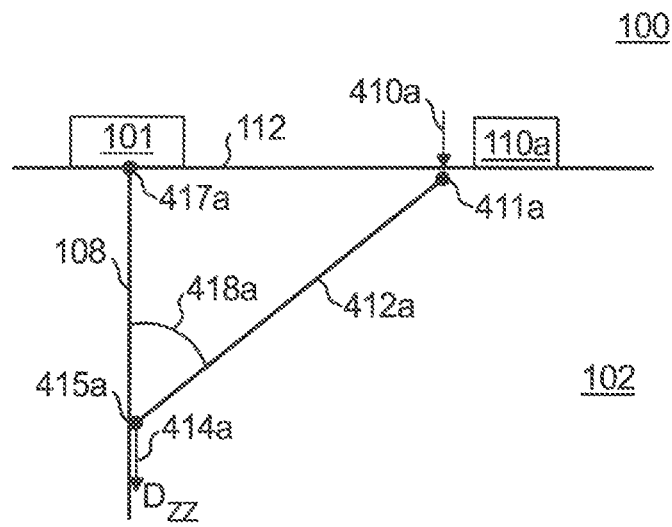
FIGS. 4A-4C are schematic diagrams illustrating DAS application and sensing of seismic energy using different seismic energy sources in accordance with embodiments of the present disclosure.

With reference to FIG. 4A, a P source 110a and optical fiber 108 of DAS VSP system 100 are shown. The P source 110a is included in a source set (e.g., source set 110 shown in FIG. 1) that is positioned at the surface 112 of formation 102. The optical fiber 108 is disposed in a wellbore (not shown). The optical fiber 108 acts as a DAS receiver that senses seismic forces applied to the formation 102.

When the P source 110a applies a vertical seismic force 410a to the formation 102, a seismic wave 412a that radiates from application of the force 410a at point 411a impacts the optical fiber 108 at point 415a and is sensed by the optical fiber 108.

The optical fiber 108 measures a component $D_{zz}$ 414a oriented parallel to the axis of the optical fiber 108, wherein the notation used for component $D_{zz}$ 414a includes first and second indices. The first index indicates orientation of the seismic energy source, which is P source 110a in the present example. The second index indicates direction of the incident wave field at the receiver. When the receiver is the optical fiber 108, direction of the incident wave field at the receiver is the orientation of the longitudinal axis of the optical fiber 108. A response of the optical fiber 108 to the seismic wave 412a that represents component $D_{zz}$ 414a is detected by a DAS VSP collection system 101 at point 417a.

In the example shown in FIG. 4A, the wellbore and the optical fiber 108 are oriented in a vertical direction. In other embodiments, the wellbore and optical fiber 108 can be oriented in a horizontal direction. The z direction, as used with reference to FIG. 4, refers to the direction of the longitudinal axis of the optical fiber 108, which is oriented in the same direction as orientation of the wellbore.

In contrast to a DAS receiver, such as optical fiber 108, a geophone receiver disposed in the wellbore would respond to application of the vertical force 410 by sensing three orthogonal components of the seismic energy 412a, which can be labeled ($G_{zx}$, $G_{zy}$, $G_{zz}$).

Figure 4B:
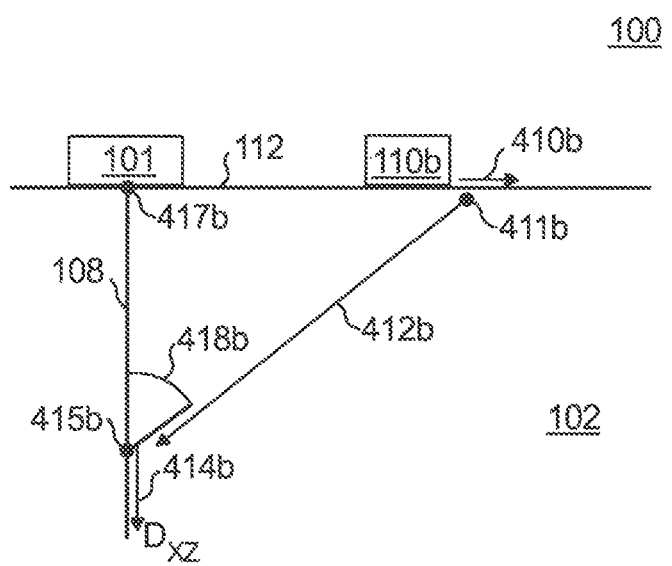

With reference to FIG. 4B, a first S source 110b of the source set is shown. The first S source 110b applies a first horizontal seismic force 410b to the formation 102. The first horizontal seismic force 410b is orthogonal to the vertical seismic force 410a. Application of the first horizontal seismic force 410b results in a seismic wave 412b that radiates from application of the force 410b at point 411b and impacts the optical fiber 108 at point 415b. The optical fiber 108 senses and measures a component $D_{xz}$ of force 410b. A response of the optical fiber 108 to the seismic wave 412b, wherein the response represents component 414b, is detected by the VSP collection system 101 at point 417b.

In contrast to a DAS receiver, such as optical fiber 108, a geophone receiver disposed in the wellbore would respond to application of the vertical force 410 by sensing three orthogonal components of the seismic energy 412b, which can be labeled ($G_{xx}$, $G_{xy}$, $G_{xz}$).

Figure 4C:
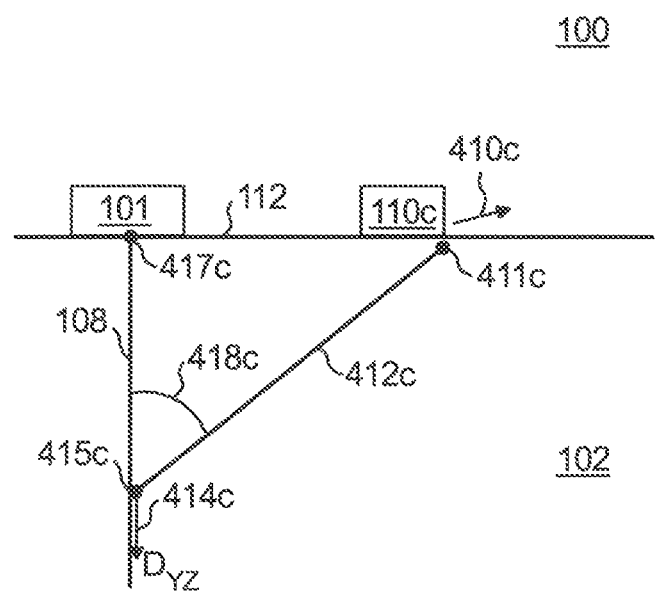

With reference to FIG. 4C, a second S source 110c of the source set is shown. The second S source 110c applies a second horizontal seismic force 410c to the formation 102. The second horizontal seismic force 410c is orthogonal to both the vertical seismic force 410a and the first horizontal seismic force 410b. Application of the second horizontal seismic force 410c results in a seismic wave 412c that radiates from application of the force 410c at point 411c and impacts the optical fiber 108 at point 415c. The optical fiber 108 senses and measures a component $D_{yz}$ of force 410c. A response of the optical fiber 108 to the seismic wave 412c, wherein the response represents component 414c, is detected by the DAS VSP collection system 101 at point 417c.

In contrast to a DAS receiver, such as optical fiber 108, a geophone receiver disposed in the wellbore would respond to application of the vertical force 410c by sensing three orthogonal components of the seismic energy 412c, which can be labeled ($G_{yx}$, $G_{yy}$, $G_{yz}$).

Accordingly, using the vertical P source and the first and second horizontal S sources, the DAS VSP system 100 will record first component 414a $D_{zz}$, second component 414b $D_{xz}$, and third component 414c $D_{yz}$. However, in a conventional VSP system using geophones, nine components would be recorded in response to seismic energy generated by a vertical source and two orthogonal horizontal sources, namely $G_{zx}$, $G_{zy}$, $G_{zz}$, $G_{xx}$, $G_{xy}$, $G_{xz}$, $G_{yx}$, $G_{yy}$, and $G_{yz}$.

With returned reference to FIG. 3, information processing system 200 receives DAS data associated with signals $D_{zz}$, $D_{xz}$, and $D_{yz}$ from DAS VSP collection system 101 and invokes reciprocity to model a system having an equivalent vertical point force source in the wellbore and three component receivers at the surface. In the model, the three component receivers are positioned at a location that corresponds to the location at which the source set 110 is positioned (as shown in FIG. 1A). The model provides an opportunity to combine the three components 414a $D_{zz}$, 414b $D_{xz}$, and 414c $D_{yz}$ to provide 3-C data using the DAS VSP system 100, whereas 3-C data is traditionally only available using geophones.

For any one point of application (also referred to as "shot point") of seismic energy, the three seismic energy sources can all be located in the same physical position. For vibrator sources, two types of seismic energy sources are used, including a vertical vibrator and a horizontal vibrator. In a scenario in which the first source to be energized is a vertical vibrator, a first vibrator truck with a vertical vibrator is positioned and the seismic energy is applied in a first direction, which is a vertical direction that is referred to as the z direction. After application of the vertical seismic energy and corresponding seismic data is collected by an information processing system, the first vibrator truck is moved away from the point of application.

Next, a horizontal vibrator source is moved to the application point and oriented to vibrate in a second direction that is horizontal and referred to as the x direction. After the seismic energy is applied in the x direction and the corresponding seismic data is collected by the information processing system, the horizontal vibrator is moved to be oriented in a third direction that is horizontal and orthogonal to the first and second directions, e.g., the y direction. The information processing system then collects the corresponding seismic data. For other source types, the device or devices that apply the seismic energy are moved, one at a time, to the location of the application point, oriented, energized, and then moved as necessary, in a similar way to the vibrators, to obtain each of the three source orientations.

Figure 5A:
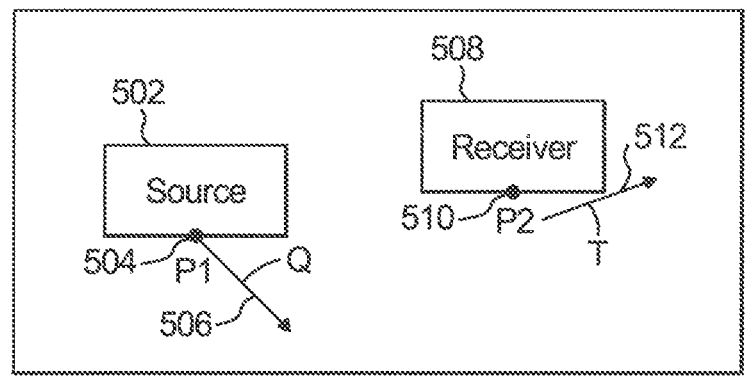
FIGS. 5A and 5B are schematic diagrams illustrating reciprocity of an energy source and an energy receiver that are applied to embodiments of the present disclosure.
Figure 5B:
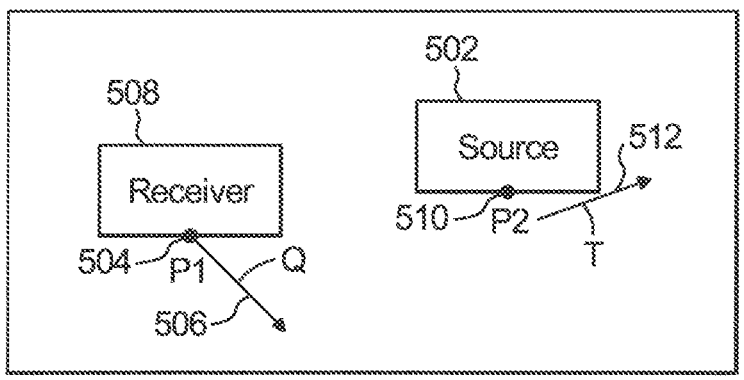

With reference to FIGS. 5A and 5B, reciprocity can be used to switch the positions of sources and receivers. FIG. 5A shows a source 502 located at a point 504 labeled P1 and oriented in a direction 506 labeled Q. Also shown is a receiver 508 located at a point 510 labeled P2 and oriented in a direction 512 labeled T. FIG. 5B shows a model in which reciprocity is used to switch the locations of the source 502 and the receiver 508. The equivalent model provides receiver 508 at point 504 P1 and oriented in direction 506 Q. The source 502 is located at point 510 P2 and oriented in direction 512 (labeled T). Measurements obtained using the configuration shown in FIG. 5A can be applied to the configuration in FIG. 5B.

Figure 6:
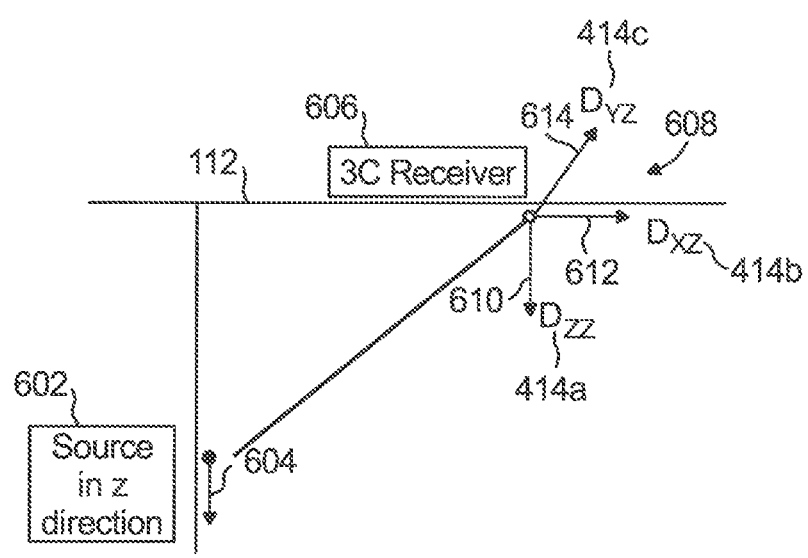
FIG. 6 is a schematic diagram illustrating application of reciprocity to sensing of seismic energy using different seismic energy sources in association with DAS applications in accordance with embodiments of the present disclosure.

With reference to FIG. 6, applying reciprocity, the configuration of FIGS. 4A, 4B, and 4C are equivalent to the configuration of FIG. 6. FIGS. 4A, 4B, and 4C provide three sources 110a, 110b, and 110c applying seismic energy in directions 410a, 410b, and 410c, respectively, and optic fiber 108 responding with components 414a $D_{zz}$, 414b $D_{xz}$, 414c $D_{yz}$, as recorded by the DAS VSP collection system 101. The three sources 110a, 110b, and 110c of FIGS. 4A, 4B, and 4C are equivalent to a vertical source 602 of FIG. 6 that exerts a force 604 directed in the z direction and positioned in the wellbore. The optic fiber 108 of FIGS. 4A, 4B, and 4C provided in the wellbore is equivalent to a 3-C receiver 606 provided at the surface 112 that generates a 3-C signal 608 that includes components 414a $D_{zz}$, 414b $D_{xz}$, and 414c $D_{yz}$.

In other words, generation of the component 414a $D_{zz}$ in FIG. 4A is equivalent to a vertical force 604 applied in the wellbore sensed by a DAS cable 610 oriented vertically at the surface 112. Generation of the component 414b $D_{xz}$ is equivalent to the vertical force 604 in the wellbore sensed by a DAS cable 612 oriented in the X direction at the surface 112. Similarly, generation of the component 414c $D_{yz}$ is equivalent to the vertical force 604 in the wellbore and a DAS cable 614 oriented in the Y direction at the surface 112.

The three sources 110a, 110b, and 110c shown in FIGS. 4A-4C, have different characteristics. For example, a P source provided as a vertical seismic source, such as P source 110a, has a wider source spectrum than an S source provided as a horizontal seismic source, such as first and second S sources 110b and 110c. Shear waves from a horizontal vibrator, such as first and second S sources 110b and 110c, are more difficult to create than P waves generated by a vertical P wave vibrator, such as P source 110a.

The information processing system 200 shown in FIG. 2 compensates for differences in characteristics of the three sources 110a, 110b, 110c in order to apply reciprocity to model responses to the three sources 110a, 110b, 110c, namely components 414a $D_{zz}$, 414b $D_{xz}$, 414c $D_{yz}$, as 3-C components associated with a single receiver.

The information processing system 200 performs compensation operations to equalize the source characteristics using algorithms. The compensation operations can include, for example and without limitation, spectral analysis, band pass filtering, amplitude balancing, wavelet shaping, hodogram analysis, and fiber response amplitude correction. The compensation operations can be performed in the order as listed above, but is not limited to this order.

Applying compensation operations to the measured components 414a $D_{zz}$, 414b $D_{xz}$, 414c $D_{yz}$ can provide equivalent 3-C vector fidelity associated with a wave field. The wave field allows for rotation of the components 414a $D_{zz}$, 414b $D_{xz}$, 414c $D_{yz}$, after compensation is applied, to identify and isolate P and S waves that were recorded by the DAS VSP collection system.

Turning attention to the compensation operation to correct fiber response amplitude, response of the optical fiber to P and S waves is attenuated by respective factors related to the incidence angle of the seismic wave. Factors for correcting fiber response amplitude is described in Mateeva, A. J. et al, Advances in Distributed Acoustic Sensing (DAS) For VSP, SEG Annual Meeting, SEG-2012-0739, 2012, and Bakku, S. K., Fracture Characterization From Seismic Measurements in a Borehole, PhD Thesis, Massachusetts Institute of Technology, 2014.

Response of the optical fiber to P waves is attenuated by a factor of $\cos^2\theta$, where $\theta$ is the angle that the seismic wave forms with the optical fiber. When $\theta=0°$, the P wave propagates along the axial direction of the optical fiber. When $\theta=90°$, the P wave propagates in a direction normal to the optical fiber. Accordingly, the P wave imparts its full effect on strain in the optical fiber when $\theta=0°$, since $\cos^2\theta=1$, whereas when $\theta=90°$, the P wave is completely attenuated, since $\cos^2\theta=0$.

FIGS. 4A-4C indicate that the angles of incidence formed at a particular depth (or channel) by the optical fiber 108 and a P wave generated by the vertical P source 110a or the first and second horizontal S sources 110b and 110c are identical. In particular, an angle of incidence 418a defined by points 411a, 415a, and 417a shown in FIG. 4A is equal to an angle of incidence 418b defined by points 411b, 415b, and 417b shown in FIG. 4B, both of which are equal to an angle of incidence 418c defined by points 411c, 415c, and 417c shown in FIG. 4C.

Since the angle of incidence at a particular depth associated with each of the three sources 110a, 110b, 110c is the same, the amplitude correction for the attenuation factor $1/\cos^2\theta$ associated with P waves is the same for each of these three sources 110a, 110b, 110c. Thus the same attenuation factor $\cos^2\theta$ is removed from the components 414a $D_{zz}$, 414b $D_{xz}$, 414c $D_{yz}$ associated with each of the three sources 110a, 110b, 110c. DAS data associated with each depth (channel) of the wellbore are associated with a different angle of incidence, $\theta$, due to the geometry of a ray path of the seismic wave field, and thus each channel will have a different attenuation factor to be used for compensation.

The information processing system 200 applies a $1/(\cos^2\theta)$ attenuation factor to the DAS data. However application of an attenuation factor of zero at $\theta=90°$ is undefined. Accordingly, application of the attenuation factor includes avoiding the singularity where $\cos^2(90)=0$ and a small angle range around this singularity.

In a similar fashion, response of the optical fiber to S waves is attenuated by a factor of $\sin(2\theta)$. When $\theta=0°$, the S wave propagates along the axial direction of the fiber. When $\theta=90°$, the S wave propagates normal to the fiber. The S wave is completely attenuated in the fiber when $\theta=0°$, $90°$, $180°$, and $270°$, since $\sin 2\theta=0$ for these angles, whereas the fiber response for S waves is perfect for angles of $\theta=45°$, $135°$, $225°$, and $315°$, since $\sin 2\theta=1$ for these angles.

Again, FIGS. 4A-4C indicate that the angles of incidence formed at a particular depth (or channel) by the optical fiber and an S wave generated by the vertical P source 110a or the first and second horizontal S sources 110b and 110c are identical. Since the angle of incidence at a particular depth associated with each of the three sources 110a, 110b, 110c is the same, the amplitude correction for the attenuation factor $\sin 2\theta$ associated with S waves is the same for each of these three sources 110a, 110b, 110c. Thus the same attenuation factor $\sin 2\theta$ is removed from the components 414a $D_{zz}$, 414b $D_{xz}$, 414c $D_{yz}$ associated with each of the three sources 110a, 110b, 110c. DAS data associated with each depth (channel) of the wellbore are associated with a different angle of incidence, $\theta$, due to the geometry of a ray path of the seismic wave field, and thus each channel will have a different attenuation factor to be used for compensation.

The information processing system 200 shown in FIG. 2 applies a $1/(\sin 2\theta)$ attenuation factor to the DAS data. However application of an attenuation factor of zero at $\theta=90°$ is undefined. Accordingly, application of the attenuation factor includes avoiding the singularity where $\sin(2\theta)=0$ and a small angle range around these singularities.

The information processing system 200 can perform operations to compensate separately for fiber response amplitudes associated with P waves and S waves. Each wave type (P and S) and each channel applies a separate set of attenuation compensation factors.

The incident angle θ can be determined from a hodogram analysis of the three components $D_{zz}$, $D_{xz}$, $D_{yz}$. On the other hand, if the velocity of the rocks surrounding the well, also referred to as the formation velocity, is known, then the incident angle θ can be computed. from local apparent velocity and the known formation velocity. For example, the formation velocity, can be determined from zero offset derived velocities or sonic log velocities, as is well known to those skilled in the art. The local apparent velocity (also referred to as apparent velocity) is the measured velocity of a particular wave based on arrival time and a corresponding depth. Since the seismic waves impinging on the borehole may not be propagating parallel to the direction of the borehole, the apparent velocity, as measured, may not be accurate, and may be considerably faster than the actual formation velocity. Incident angle θ can be determined using Equation (1) as follows:

$$\theta = \cos^{-1}((\text{Formation Velocity})/(\text{Apparent Velocity})) \quad (1)$$

Figure 7:
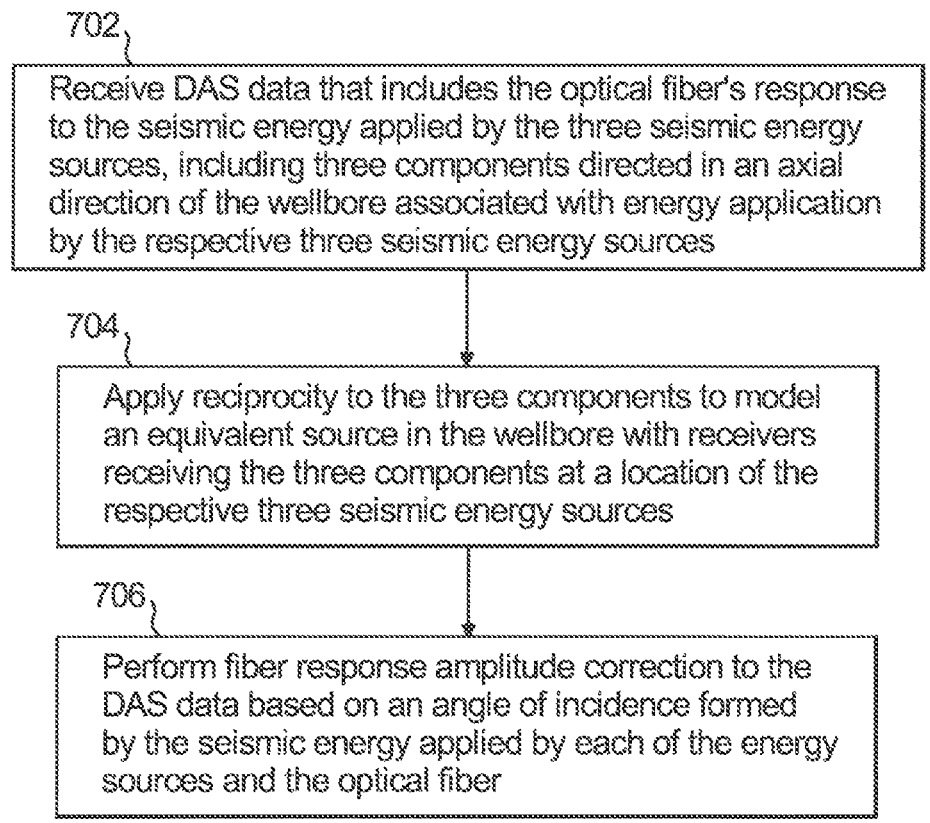
FIG. 7 is a flowchart illustrating operations of a method in accordance with embodiments of the present disclosure.

With reference now to FIG. 7, shown is a flowchart demonstrating implementation of the various exemplary embodiments. It is noted that the order of operations shown in FIG. 7 is not required, so in principle, the various operations may be performed out of the illustrated order. Also certain operations may be skipped, different operations may be added or substituted, or selected operations or groups of operations may be performed in a separate application following the embodiments described herein.

The operations shown in FIG. 7 can be performed by the information processing system 200 shown in FIG. 2. In particular, the processor 204 may execute the DAS data processing software module 208, causing the processor 204 to perform the operations shown in the flowchart and described in the disclosure.

At operation 702, DAS data is received that includes the optical fiber's response to the seismic energy applied by the three seismic energy sources. The DAS data is associated with three components directed in an axial direction of the wellbore associated with energy application by the respective three seismic energy sources.

At operation 704, reciprocity is applied to the three components to model an equivalent source in the wellbore and a receiver receiving the three components at a location of the respective actual three seismic energy sources.

At operation 706, fiber response amplitude correction is applied to the DAS data based on an angle of incidence formed by the seismic energy applied by each of the energy sources and the optical fiber. At operation 706, a series of correction operations can be performed to correct for differences between the different seismic energy sources. These correction operations can include, for example and without limitation, spectral analysis, band pass filtering, amplitude balancing, wavelet shaping, hodogram analysis, and fiber response amplitude correction. The compensation operations can be performed in the order as listed above, but the method of the disclosure is not limited to this order.

Operations 706 can be repeated at different channels of the optical fiber using an incident angle θ determined for the respective channels.

In accordance with aspects of the disclosure, embodiments of the disclosure are related to a DAS VSP system. The DAS VSP system includes three seismic energy sources each configured to apply seismic energy to an optical fiber in a direction that is orthogonal to a direction of seismic energy applied by the other two seismic energy sources, the optical fiber being at least partially positioned within a wellbore.

The DAS VSP system further includes an information processing system including a processor and a memory device coupled to the processor, the memory device containing a set of instructions. The instructions, when executed by the processor, cause the processor to receive DAS data associated with the optical fiber's response to the seismic energy applied by the three seismic energy sources, the response including three components directed in an axial direction of the wellbore associated with energy application by the respective three seismic energy sources.

The instructions, when executed by the processor, further cause the processor to apply reciprocity to the three components to model an equivalent vertical point force source in the wellbore with receivers configured to receive the three components at a location of the respective three seismic energy sources.

In embodiments, the set of instructions can further cause the processor to perform fiber response amplitude correction to the DAS data based on an angle of incidence formed by the seismic energy applied by each of the energy sources and the optical fiber. At a given channel of the optical fiber, the angle of incidence can be the same for the seismic energy applied by each of the energy sources. The angle of incidence can change based on the channel of the optical fiber to which the seismic energy is applied.

A first energy source of the energy sources can be a point force source that applies energy vertically oriented along a z-axis, a second energy source of the energy sources can be a shear wave source that applies energy oriented along a y-axis in a direction orthogonal to the z-axis, and a third energy source of the energy sources can be a shear wave source that applies energy oriented along an x-axis in a direction orthogonal to the y- and z-axes.

In embodiments, a compensation factor of $1/\cos^2\theta$ can be applied to respective components of the DAS data to perform fiber response amplitude correction to P waves of the seismic energy applied by the energy sources, wherein θ is the angle of incidence formed by the seismic energy applied by the corresponding point force source and the optical fiber. A compensation factor of $1/\sin 2\theta$ can be applied to respective components of the DAS data to perform fiber response amplitude correction to S waves of the seismic energy applied by the energy sources.

In embodiments, $\theta = \cos^{-1}$ (formation velocity/local apparent velocity). Additionally, in embodiments θ can be determined based on a hodogram analysis of components of the DAS data associated with the energy applied along the x-, y-, and z-axes.

In yet another aspect, the disclosed embodiments are related to a method for processing DAS VSP data. The method includes operations to receive DAS data associated with an optical fiber's response to seismic energy applied by three seismic energy sources. The three seismic energy sources each configured to apply seismic energy to the optical fiber in a direction that is orthogonal to a direction of seismic energy applied by the other two seismic energy sources, the optical fiber is at least partially positioned within a wellbore, and the DAS data includes three components directed in an axial direction of the wellbore associated with energy application by the respective three seismic energy sources. The method further includes operations to apply reciprocity to the three components to model an equivalent vertical point force source in the wellbore with receivers configured to receive the three components at a location of the respective three seismic energy sources.

In embodiments, the method further includes operations to perform fiber response amplitude correction to the DAS data based on an angle of incidence formed by the seismic energy applied by each of the energy sources and the optical fiber. At a given channel of the optical fiber, the angle of incidence can be the same for the seismic energy applied by each of the energy sources. The angle of incidence can change based on the channel of the optical fiber to which the seismic energy is applied.

Seismic energy applied by a first energy source of the energy sources can be vertically oriented along a z-axis, seismic energy applied by a second energy source of the energy sources is horizontally oriented along a y-axis in a direction orthogonal to the z-axis, and seismic energy applied by a third source of the energy sources is horizontally oriented along an x-axis in a direction orthogonal to the y- and z-axes.

In embodiments, operations to perform fiber response amplitude correction can include applying a correction factor of $1/\cos^2\theta$ to the DAS data to perform fiber response amplitude correction to P waves of the seismic energy applied by the energy sources, wherein $\theta$ is the angle of incidence formed by the seismic energy applied by the point force source and the optical fiber.

In further embodiments, operations to perform fiber response amplitude correction can include applying a correction factor of $1/\sin 2\theta$ to of the DAS data to perform fiber response amplitude correction to S waves of the seismic energy applied by the energy sources.

In embodiments, $\theta=\cos^{-1}$ (formation velocity/local apparent velocity). In further embodiments, $\theta$ can be determined based on a hodogram analysis of components of the DAS data associated with the energy applied along the x-, y-, and z-axes.

In a further aspect, the disclosed embodiments are related to an information processing system communicatively coupled to a DAS data collection system. The information processing system includes a processor and a memory device coupled to the processor, the memory device containing a set of instruction that, when executed by the processor, cause the processor to receive DAS data associated with an optical fiber's response to seismic energy applied by three seismic energy sources.

The three seismic energy sources are each configured to apply seismic energy to the optical fiber in a direction that is orthogonal to a direction of seismic energy applied by the other two seismic energy sources. The optical fiber is at least partially positioned within a wellbore. The DAS data includes three components directed in an axial direction of the wellbore associated with energy application by the respective three seismic energy sources. The instructions, when executed by the processor, cause the processor to apply reciprocity to the three components to model an equivalent vertical point force source in the wellbore with receivers configured to receive the three components at a location of the respective three seismic energy sources.

In embodiments, the set of instructions when executed by the processor can cause the processor to perform fiber response amplitude correction to the DAS data based on an angle of incidence formed by the seismic energy applied by each of the energy sources and the optical fiber.

Accordingly, the disclosed system and methods provide the ability to obtain 3-C DAS data sets without the disadvantages associated with traditional VSP methods that use geophones. The 3-C data sets can be processed to isolate wave types (such as P and S waves), perform full vector imaging, and reorient a wavefield recorded based upon seismic energy source location.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the disclosed embodiments as defined in the appended claims.

What is claimed is:

1. A system, comprising:
an optical fiber being at least partially positioned within a wellbore;
three seismic energy sources, each configured to apply seismic energy external to the wellbore to the optical fiber in a direction that is orthogonal to a direction of seismic energy applied by the other two seismic energy sources; and
an information processing system including a processor and a memory device coupled to the processor, the memory device containing a set of instructions that, when executed by the processor, cause the processor to:
receive optical fiber response data from the optical fiber's response to the seismic energy applied by the three seismic energy sources, the response data including three components directed in an axial direction of the wellbore associated with energy application by the respective three seismic energy sources; and
apply reciprocity to the three components to determine an equivalent vertical point force source in the wellbore operating with receivers configured to receive the three components at a location of the respective three seismic energy sources.

2. The system of claim 1, wherein the set of instructions further cause the processor to perform fiber response amplitude correction to the response data based on an angle of incidence formed by the seismic energy applied by each of the energy sources and the optical fiber.

3. The system of claim 2, wherein at a given channel of the optical fiber, the angle of incidence is the same for the seismic energy applied by each of the energy sources.

4. The system of claim 3, wherein the angle of incidence changes based on the channel of the optical fiber to which the seismic energy is applied.

5. The system of claim 2, wherein a compensation factor of $1/\cos^2\theta$ is applied to the respective components of the response data to perform fiber response amplitude correction to P waves of the seismic energy applied by the energy sources, wherein $\theta$ is the angle of incidence formed by the seismic energy applied by the point force sources and the optical fiber.

6. The system of claim 5, wherein $\theta=\cos-1$ (formation velocity/apparent velocity).

7. The system of claim 5, wherein $\theta$ is determined based on a hodogram analysis of components of the response data associated with the energy applied along the x-, y-, and z-axes.

8. The system of claim 2, wherein a compensation factor of $1/\sin 2\theta$ is applied to respective components of the response data to perform fiber response amplitude correction to S waves of the seismic energy applied by the energy sources, wherein $\theta$ is the angle of incidence formed by the seismic energy applied by the point force sources and the optical fiber.

9. The system of claim 1, wherein a first energy source of the energy sources is a point force source that applies energy vertically oriented along a z-axis, a second energy source of the energy sources is a shear wave source that applies energy oriented along a y-axis in a direction orthogonal to the z-axis, and a third energy source of the energy sources is a shear wave source that applies energy oriented along an x-axis in a direction orthogonal to the y- and z-axes.

10. The system of claim 1, wherein the set of instructions further cause the processor to determine properties of a formation associated with the wellbore for correcting operations performed in association with the formation or wellbore.

11. A method comprising operations to:
receive optical fiber response data from an optical fiber's response to seismic energy applied by three seismic energy sources, the three seismic energy sources each configured to apply seismic energy-external to the wellbore to the optical fiber in a direction that is orthogonal to a direction of seismic energy applied by the other two seismic energy sources, the optical fiber being at least partially positioned within the wellbore, the response data including three components directed in an axial direction of the wellbore associated with energy application by the respective three seismic energy sources; and
apply reciprocity to the three components to determine an equivalent vertical point force source in the wellbore operating with receivers configured to receive the three components at a location of the respective three seismic energy sources.

12. The method of claim 11, further comprising operations to perform fiber response amplitude correction to the response data based on an angle of incidence formed by the seismic energy applied by each of the energy sources and the optical fiber.

13. The method of claim 12, wherein at a given channel of the optical fiber, the angle of incidence is the same for the seismic energy applied by each of the energy sources.

14. The method of claim 13, wherein the angle of incidence changes based on the channel of the optical fiber to which the seismic energy is applied.

15. The method of claim 12, wherein operations to perform fiber response amplitude correction include applying a correction factor of $1/\cos^2\theta$ to respective components of the response data to perform fiber response amplitude correction to P waves of the seismic energy applied by the energy sources, wherein $\theta$ is the angle of incidence formed by the seismic energy applied by the point force source and the optical fiber.

16. The method of claim 15, wherein $\theta=\cos-1$ (formation velocity/apparent velocity).

17. The method of claim 15, wherein $\theta$ is determined based on a hodogram analysis of components of the response data associated with the energy applied along the x-, y-, and z-axes.

18. The method of claim 12, wherein operations to perform fiber response amplitude correction include applying a correction factor of $1/\sin 2\theta$ to components of the response data to perform fiber response amplitude correction to S waves of the seismic energy applied by the energy sources, wherein $\theta$ is the angle of incidence formed by the seismic energy applied by the point force sources and the optical fiber.

19. The method of claim 11, wherein seismic energy applied by a first energy source of the energy sources is vertically oriented along a z-axis, seismic energy applied by a second energy source of the energy sources is horizontally oriented along a y-axis in a direction orthogonal to the z-axis, and seismic energy applied by a third source of the energy sources is horizontally oriented along an x-axis in a direction orthogonal to the y- and z-axes.

20. An information processing system comprising a processor and a memory device coupled to the processor, the memory device containing a set of instruction that, when executed by the processor, cause the processor to:
receive optical fiber response data from an optical fiber's response to seismic energy applied by three seismic energy sources, the three seismic energy sources each configured to apply seismic energy external to the wellbore to the optical fiber in a direction that is orthogonal to a direction of seismic energy applied by the other two seismic energy sources, the optical fiber being at least partially positioned within the wellbore, the response data including three components directed in an axial direction of the wellbore associated with energy application by the respective three seismic energy sources; and
apply reciprocity to the three components to determine an equivalent vertical point force source in the wellbore operating with receivers configured to receive the three components at a location of the respective three seismic energy sources.

21. The information processing system of claim 20, wherein the set of instructions when executed by the processor cause the processor to perform fiber response amplitude correction to the response data based on an angle of incidence formed by the seismic energy applied by each of the energy sources and the optical fiber.

* * * * *